United States Patent
Cui et al.

(10) Patent No.: US 11,026,209 B2
(45) Date of Patent: Jun. 1, 2021

(54) METHOD AND APPARATUS FOR PROCESSING PAGING MESSAGE

(71) Applicant: BEIJING XIAOMI MOBILE SOFTWARE CO., LTD., Beijing (CN)

(72) Inventors: Hengbin Cui, Beijing (CN); Long Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/583,466

(22) Filed: Sep. 26, 2019

(65) Prior Publication Data

US 2020/0107293 A1    Apr. 2, 2020

(30) Foreign Application Priority Data

Sep. 29, 2018 (CN) .......................... 201811152152.8

(51) Int. Cl.
| | |
|---|---|
| *H04W 68/00* | (2009.01) |
| *H04W 76/25* | (2018.01) |
| *H04W 8/18* | (2009.01) |
| *H04W 8/20* | (2009.01) |

(52) U.S. Cl.
CPC ......... *H04W 68/005* (2013.01); *H04W 8/186* (2013.01); *H04W 8/20* (2013.01); *H04W 76/25* (2018.02)

(58) Field of Classification Search
CPC ... H04W 68/005; H04W 76/25; H04W 8/186; H04W 8/20; H04W 76/18; H04W 8/183
See application file for complete search history.

(56) References Cited

U.S. PATENT DOCUMENTS

| | | | | |
|---|---|---|---|---|
| 2005/0164720 A1* | 7/2005 | Huang | ................. | H04M 3/436 455/466 |
| 2007/0259651 A1* | 11/2007 | Bae | .................... | H04L 65/1006 455/412.1 |
| 2012/0027003 A1* | 2/2012 | Chin | ................. | H04W 52/0216 370/342 |

(Continued)

FOREIGN PATENT DOCUMENTS

| | | |
|---|---|---|
| CN | 101808415 A | 8/2010 |
| CN | 103039117 A | 4/2013 |

(Continued)

OTHER PUBLICATIONS

European Patent Office, Extended European Search Report mailed in Application No. 19200089.1, dated Feb. 11, 2020, Germany, 10 pages.

*Primary Examiner* — Christine Ng
(74) *Attorney, Agent, or Firm* — Syncoda LLC; Feng Ma

(57) ABSTRACT

A method and an apparatus for processing a paging message can be applied to a terminal device supporting a plurality of Subscriber Identification Module (SIM) cards. The method includes: a target paging message corresponding to a SIM card of a current paging cycle from a network side is received; it is determined whether the target paging message belongs to a spam message paging a slave SIM card, wherein the slave SIM card is any one of the plurality of SIM cards that does not provide a data service; and the target paging message is discarded when the target paging message belongs to the spam message paging the slave SIM card.

20 Claims, 7 Drawing Sheets

(56) References Cited

U.S. PATENT DOCUMENTS

| | | | |
|---|---|---|---|
| 2013/0273971 A1* | 10/2013 | Adamietz | H04W 76/15 |
| | | | 455/558 |
| 2013/0316764 A1 | 11/2013 | Mehio et al. | |
| 2015/0327207 A1* | 11/2015 | Bharadwaj | H04W 4/60 |
| | | | 455/435.2 |
| 2017/0094485 A1* | 3/2017 | Saxena | H04W 4/14 |
| 2017/0134994 A1* | 5/2017 | Chinthalapudi | H04L 65/1089 |
| 2017/0150545 A1 | 5/2017 | Ramkumar et al. | |
| 2018/0005282 A1* | 1/2018 | Quimby | G06Q 30/0273 |
| 2020/0178065 A1* | 6/2020 | Huber | H04W 76/28 |
| 2020/0304984 A1* | 9/2020 | Dhanapal | H04W 56/001 |

FOREIGN PATENT DOCUMENTS

| | | |
|---|---|---|
| CN | 105554884 A | 5/2016 |
| CN | 110351704 A | 10/2019 |
| EP | 1619914 A1 | 1/2006 |
| EP | 2398282 A1 | 12/2011 |
| WO | 2009000315 A1 | 12/2008 |

\* cited by examiner

METHOD AND APPARATUS FOR PROCESSING PAGING MESSAGE

CROSS-REFERENCE TO RELATED APPLICATIONS

This application claims priority to Chinese Patent Application No. 201811152152.8 filed on Sep. 29, 2018, the entire content of which is incorporated herein by reference.

BACKGROUND

At present, there are more and more Dual-SIM Dual-Standby terminal devices. In such a terminal device, a data service can only be provided by one Subscriber Identification Module (SIM) card at the same time. However, in fact, a data link is already successfully established between each SIM card and a network side, and the network side also allocates a corresponding Internet Protocol (IP) address for each SIM card.

SUMMARY

The present disclosure relates generally to the field of communications, and more specifically to a method and an apparatus for processing a paging message.

Various embodiments of the present disclosure provide a method and an apparatus for processing a paging message to solve the deficiencies in the related art.

According to a first aspect of examples of the present disclosure, there is provided a method of processing a paging message. The method is applied to a terminal device supporting a plurality of Subscriber Identification Module (SIM) cards, and the method includes: receiving a target paging message corresponding to a SIM card of a current paging cycle from a network side; determining whether the target paging message belongs to a spam message paging a slave SIM card, wherein the slave SIM card is any one of the plurality of SIM cards which does not provide a data service; and discarding the target paging message when the target paging message belongs to the spam message paging the slave SIM card.

According to a second aspect of examples of the present disclosure, there is provided an apparatus of processing a paging message. The apparatus is applied to a terminal supporting a plurality of Subscriber Identification Module (SIM) cards, and the apparatus includes: a message determining module, configured to receive a target paging message corresponding to a SIM card of a current paging cycle from a network side, and determine whether a target paging message belongs to a spam message paging a slave SIM card, wherein the slave SIM card is any one of the plurality of SIM cards which does not provide a data service; and an executing module, configured to discard the target paging message when the target paging message belongs to the spam message paging the slave SIM card.

According to a third aspect of examples of the present disclosure, there is provided a terminal device. The terminal device supports a plurality of Subscriber Identification Module (SIM) cards, and the terminal device further includes: a processor, and a memory storing processor executable instructions. wherein when invoking the processor executable instructions, the processor is configured to: receive a target paging message corresponding to a SIM card of a current paging cycle from a network side; determine whether a target paging message belongs to a spam message paging a slave SIM card, wherein the slave SIM card is any one of the plurality of SIM cards which does not provide a data service; and discard the target paging message when the target paging message belongs to the spam message paging the slave SIM card.

According to a fourth aspect of examples of the present disclosure, there is provided a non-volatile computer readable storage medium storing computer programs, wherein the computer programs are executed by the processor to implement operations comprising: receiving a target paging message corresponding to a SIM card of a current paging cycle from a network side; determining whether the target paging message belongs to a spam message paging a slave SIM card, wherein the slave SIM card is any one of the plurality of SIM cards which does not provide a data service; and discarding the target paging message when the target paging message belongs to the spam message paging the slave SIM card.

It is to be understood that the above general descriptions and the below detailed descriptions are merely exemplary and explanatory, and are not intended to limit the present disclosure.

BRIEF DESCRIPTION OF DRAWINGS

The accompanying drawings, which are incorporated in and constitute a part of the present disclosure, illustrate examples consistent with the present disclosure and serve to explain the principles of various embodiments of the present disclosure together with the description.

DETAILED DESCRIPTION

Figure 1:
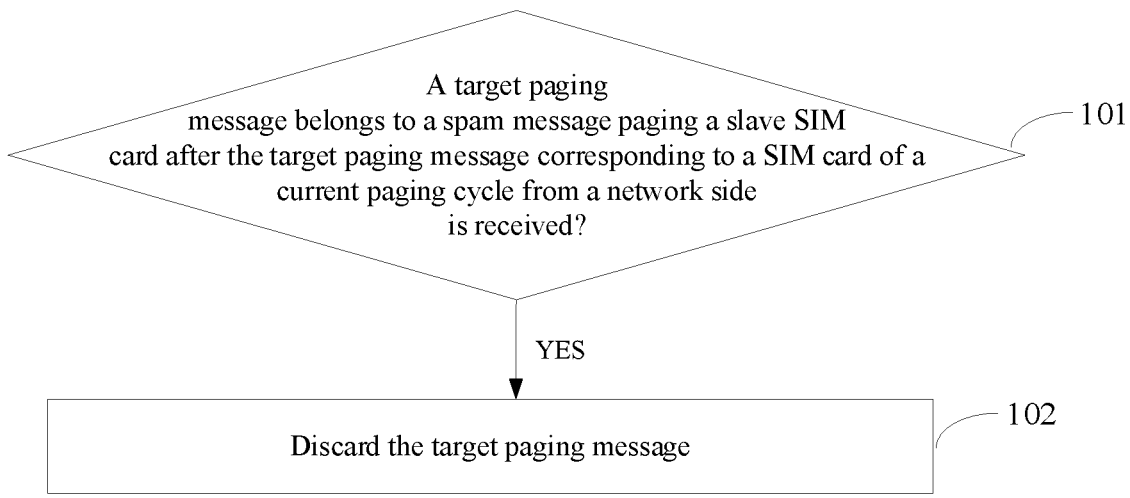
FIG. 1 is a flowchart illustrating a method of processing a paging message according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a," 'said," and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as "first," "second," "third," etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to."

The inventors of the present disclosure have recognized that, if the network side sends a spam packet to the SIM card not providing the data service, antenna resources will be switched. If the antenna resources are frequently switched, a use experience of the SIM card currently providing the data service will be affected.

A terminal device supporting a plurality of SIM cards may reside on a Long-Term Evolution (LTE) network. A Dual SIM Dual Standby terminal device is taken as an example. Both SIM cards may be attached to the LTE network, and establish a data link with a network side respectively. A user may select any one of two SIM cards as a master SIM card providing a data service, and select the other as a slave SIM card only providing a call service rather than providing the data service.

If the network side originates a paging message to page the slave SIM card, the terminal device returns a paging response to the network side after receiving the paging message, so as to facilitate establishing a data link with the network side. At this time, antenna resources of the terminal device are switched. After the antenna resources are switched to the slave SIM card, it is equivalent to block the master SIM card. For the slave SIM card, if the terminal device detects that the paging message is spam data after successfully establishing the data link with the network side, the terminal device will originate a Tracking Area Update (TAU), so that the network side can rapidly release Radio Resource Control (RRC) resources of the terminal device. In this way, the antenna resources of the terminal device are switched back to the master SIM card without affecting the data service and the call service of the master SIM card.

If spam data distributed by the network side to page the slave SIM card is large, antenna resources will be switched between two SIM cards frequently, which results in the data service interruption of the master SIM card and even missing calls, thereby reducing a user experience.

To solve the above problems, examples of the present disclosure provide a method of processing a paging message. The method may be applied to a terminal device supporting a plurality of SIM cards. FIG. 1 illustrates a method of processing a paging method according to an example of the present disclosure. The method includes the following blocks.

At block 101, whether a target paging message belongs to a spam message paging a slave SIM card is determined after the target paging message corresponding to a SIM card of a current paging cycle from a network side is received.

At this block 101, the slave SIM card is any one of the plurality of SIM cards which does not provide a data service. After receiving the target paging message of one of the SIM cards, for the SIM card, the terminal device may firstly determine whether the target paging message belongs to the spam message paging the SIM card not providing the data service, that is, the slave SIM card, rather than establish a data link with the network side.

At block 102, the target paging message is discarded if the target paging message belongs to the spam message paging the slave SIM card.

At this block, when determining that the target paging message belongs to the spam message paging the slave SIM card, the terminal device may directly discard the target paging message without establishing the data link with the network side. Therefore, a problem that the data service of the master SIM card is affected because the antenna resources of the terminal device are switched from the master SIM card providing the data service to the slave SIM card not providing the data service is avoided.

In the above examples, after receiving the target paging message corresponding to the SIM card of the current paging cycle from the network side, the terminal device may determine whether the target paging message belongs to the spam message paging the slave SIM card currently not providing the data service. If the target paging message belongs to the spam message paging the slave SIM card, the terminal device directly discards the target paging message. In this case, a problem that the antenna resources of the terminal device are frequently switched when the spam message paging the SIM card not providing the data service is received is avoided. Therefore, normal use of the service of the master SIM card currently providing the data service will not be affected, thereby improving the user experience.

Figure 2:
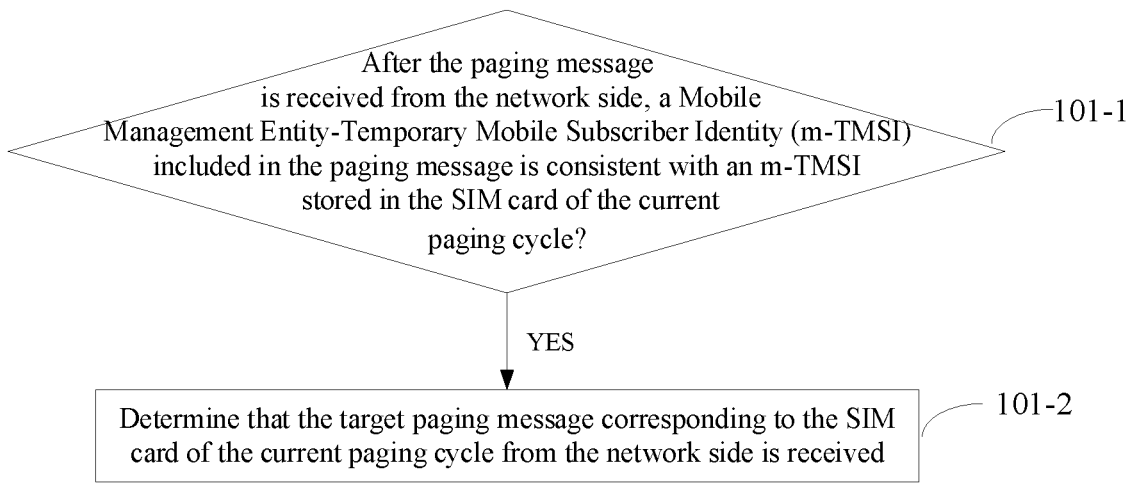
FIG. 2 is a flowchart illustrating a method of processing a paging message according to another example of the present disclosure.

In some examples, based on the examples shown in FIG. 1, FIG. 2 illustrates a method of processing a paging message according to another example of the present disclosure. At block 101, the process of receiving the target paging message corresponding to the SIM card of the current paging cycle from the network side may include the following blocks.

At block 101-1, whether a Mobile Management Entity-Temporary Mobile Subscriber Identity (m-TMSI) included in the paging message is consistent with an m-TMSI stored in the SIM card of the current paging cycle is determined after the paging message is received from the network side.

At this block, within a paging cycle corresponding to each SIM card, the terminal device decodes whether a corresponding paging message exists according to the related art.

Since a receiving priority of the paging message is low, the normal use of the data service of the master SIM card will not be substantially affected even if the paging message of the slave SIM card is received.

For the SIM card of the current paging cycle, if no message is decoded within the paging cycle, no operation is performed. If a paging message is decoded, the paging message is sent to an RRC layer of the terminal device.

The RRC layer determines whether the m-TMSI included in the paging message is consistent with an m-TMSI pre-stored in the SIM card of the current paging cycle.

At block 101-2, it is determined that the target paging message corresponding to the SIM card of the current paging cycle from the network side is received if the m-TMSI included in the paging message is consistent with the m-TMSI stored in the SIM card of the current paging cycle.

At this block, if the above two m-TMSIs are inconsistent, it indicates that the paging message is not used to page the SIM card of the current paging cycle, and the paging message may be directly discarded. If the above two m-TMSIs are consistent, it is determined that the target paging message paging the SIM card of the current paging cycle is received from the network side. Subsequently, the RRC layer may notify a Non-Access-Stratum (NAS) layer of the terminal device to perform subsequent processing.

In the above examples, the received paging message may be filtered, so as to determine the target paging message paging the SIM card of the current paging cycle, thereby avoiding problems of performing a wrong response to other paging messages and wasting the terminal device resources.

Figure 3:
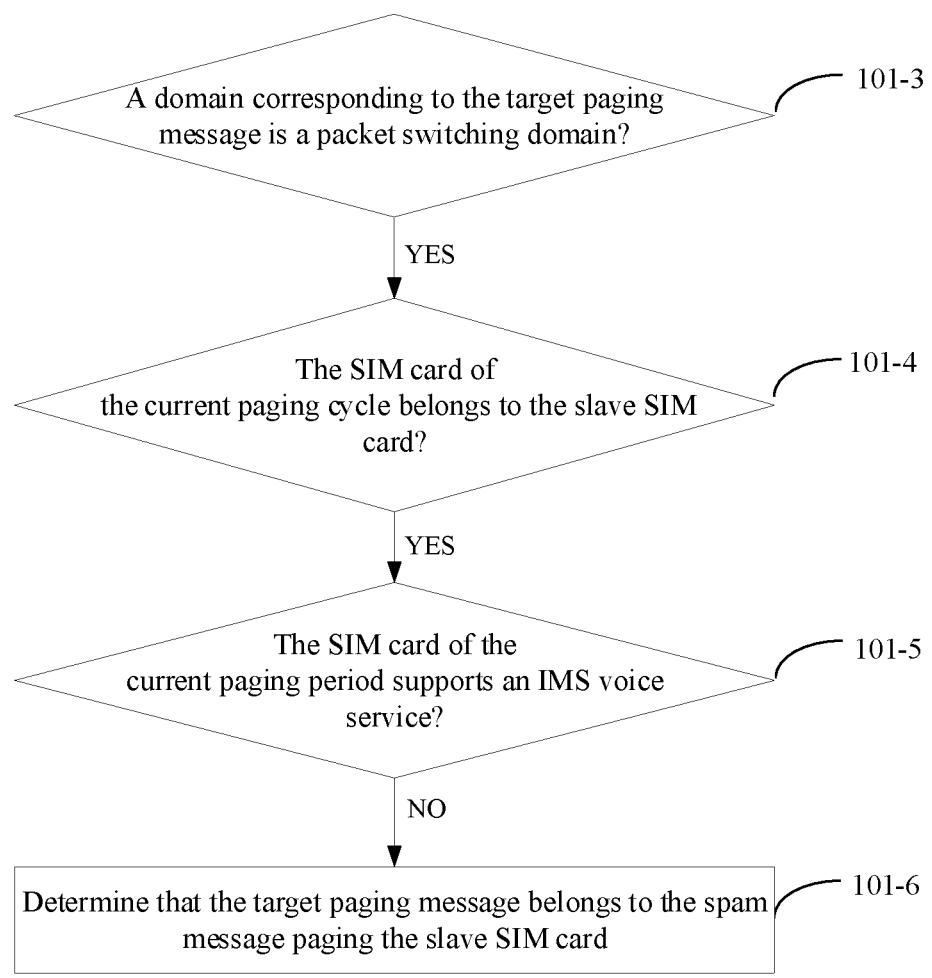
FIG. 3 is a flowchart illustrating a method of processing a paging message according to a still example of the present disclosure.

In some examples, based on the examples shown in FIG. 1, FIG. 3 illustrates a method of processing a paging message according to a still example of the present disclosure. At block 101, the process of determining whether the target paging message belongs to the spam message paging the slave SIM card may include the following blocks.

At block 101-3, whether a domain corresponding to the target paging message is a packet switching domain is determined.

At this block, the RRC layer of the terminal device will forward the target paging message to the NAS layer after determining that the target paging message corresponding to the SIM card of the current paging cycle from the network side is received. At this time, the NAS layer may determine whether the domain included in the target paging message is the packet switching domain.

If yes, block 101-4 is performed. At block 101-4, whether the SIM card of the current paging cycle belongs to the slave SIM card is determined.

At this block, the NAS layer may determine whether an object paged by the target paging message belongs to the SIM card not providing the data service by determining whether the SIM card of the current paging cycle belongs to the slave SIM card.

If yes, block 101-5 is performed. At block 101-5, whether the SIM card of the current paging cycle supports an IP Multimedia Subsystem (IMS) voice service is determined.

In the related art, the IMS voice service is also performed by using network data. Therefore, when a particular SIM card supports the IMS voice service, an IMS voice call is also notified to the terminal device by using a paging message of a packet switching domain. Accordingly, in some examples of the present disclosure, whether the SIM card of the current paging cycle supports the IMS voice service is also determined, so as to avoid missing an IMS voice call.

If the NAS layer determines that the SIM card of the current paging cycle already enables a function of supporting the IMS voice service and the SIM card of the current paging cycle already successfully registers the IMS voice service, it may be directly determined that the SIM card of the current paging cycle supports the IMS voice service. Otherwise, it may be determined that the SIM card of the current paging cycle does not support the IMS voice service.

The above blocks 101-3, 101-4 and 101-5 may be performed simultaneously or sequentially. A sequence of performing the above three blocks is not limited in the present discourse.

At block 101-6, it is determined that the target paging message belongs to the spam message paging the slave SIM card if the SIM card of the current paging cycle does not support the IMS voice service.

In some examples, if the NAS layer determines that the domain corresponding to the target paging message is the packet switching domain, it indicates that the network side notifies the SIM card of the current paging cycle of receiving the network data. If the SIM card of the current paging cycle belongs to the slave SIM card, it indicates that the object paged by the current target paging message is the slave SIM card not providing the data service. If the SIM card of the current paging cycle does not support the IMS voice service, it indicates that the target paging message is not the paging message providing the IMS voice service.

As such, it may be determined that the SIM card of the current paging cycle receives the network data, the SIM card of the current paging cycle is the slave SIM card not providing the data service, and the target paging message is not the paging message providing the IMS voice service. Therefore, it may be determined that the target paging message is the spam message paging the slave SIM card.

In the above example, the NAS layer of the terminal device may determine whether the domain corresponding to the target paging message is the packet switching domain, whether the SIM card of the current paging cycle belongs to the slave SIM card and whether the SIM card of the current paging cycle supports the IMS voice service respectively. The implementation is simple and the availability is high. In addition, when it is determined that the target paging message belongs to the spam message paging the SIM card not providing the data service, it is determined whether the SIM card of the current paging cycle supports the IMS voice service. While the accuracy of determining whether the target paging message belongs to the spam message paging the SIM card not providing the data service is guaranteed, the missed IMS phone call will be effectively avoided.

For the above block 101-3, optionally, the target paging message may be in the following form.

```
{
  {
    ue-Identity s-TMSI:
    {
      mmec '01101000'B,
      m-TMSI '11011001 10010110 00101010 10110010'B
    },
    cn-Domain ps
  },
  {
```

```
ue-Identity s-TMSI:
  {
    mmec '10101000'B,
    m-TMSI '11110100 00100000 01010111 11101001'B
  },
  cn-Domain ps
}
```

The NAS layer may determine whether what corresponds to a domain parameter is a packet switching (PS) during a process of randomly grasping the above target paging message, thereby determining whether the domain corresponding to the target paging message is the packet switching domain.

In the above example, the NAS layer may rapidly determine whether the domain corresponding to the target paging message is the packet switching domain to accurately determine whether the network side sends network data to the SIM card of the current paging cycle. Thus, the availability is high.

Figure 4:
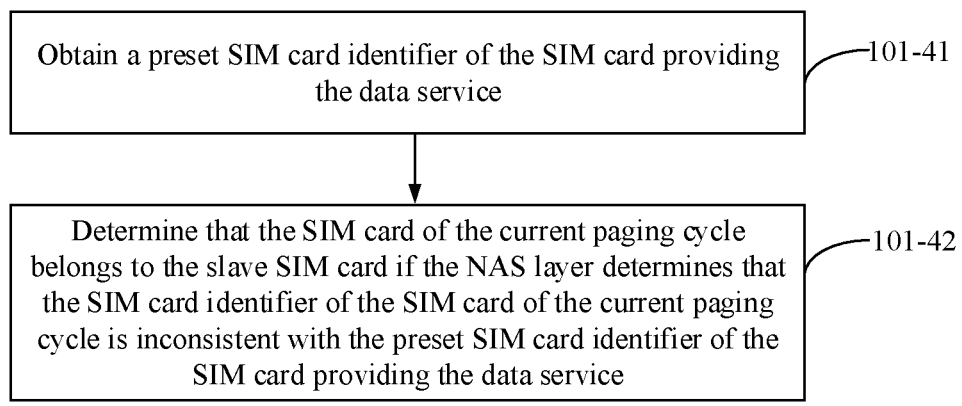
FIG. 4 is a flowchart illustrating a method of processing a paging message according to a yet example of the present disclosure.

For the above block 101-4, based on the above examples, FIG. 4 illustrates a method of processing a paging message according to a yet example of the present disclosure. Block 101-4 may include the following blocks.

At block 101-41, a preset SIM card identifier of the SIM card providing the data service is obtained.

In some examples of the present disclosure, after a user manually sets a SIM card as the master SIM card providing the data service on the terminal device, the NAS layer will mark, with a flag, the SIM card identifier of the SIM card providing the data service.

At this block, the NAS layer may directly obtain the previously-marked SIM card identifier of the SIM card providing the data service according to the related art.

At block 101-42, it is determined that the SIM card of the current paging cycle belongs to the slave SIM card if the NAS layer determines that the SIM card identifier of the SIM card of the current paging cycle is inconsistent with the preset SIM card identifier of the SIM card providing the data service.

At this block, the NAS layer may determine whether the SIM card identifier of the SIM card of the current paging cycle is consistent with the preset SIM card identifier of the SIM card providing the data service. If not, it indicates that the SIM card of the current paging cycle is one of the SIM cards not providing the data service. Therefore, the SIM card of the current paging cycle belongs to the slave SIM card.

In the above examples, the accuracy of subsequently determining whether the target paging message belongs to the spam message paging the slave SIM card may be ensured by allowing the NAS layer to directly determine whether the SIM card of the current paging cycle belongs to the slave SIM card. The implementation is simple and the availability is high.

Figure 5:
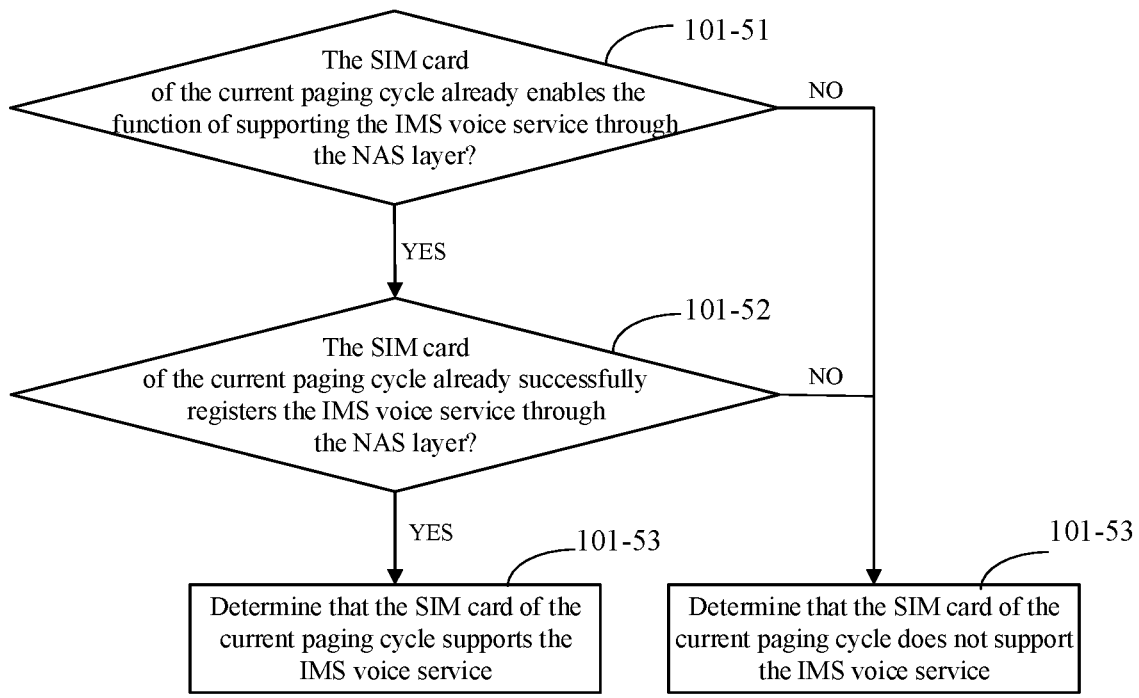
FIG. 5 is a flowchart illustrating a method of processing a paging message according to a yet example of the present disclosure.

For the above block 101-5, based on the above examples, FIG. 5 illustrates a method of processing a paging message according to a yet example of the present disclosure. Block 101-5 may include the following blocks.

At block 101-51, the NAS layer determines whether the SIM card of the current paging cycle already enables the function of supporting the IMS voice service.

Figure 6:
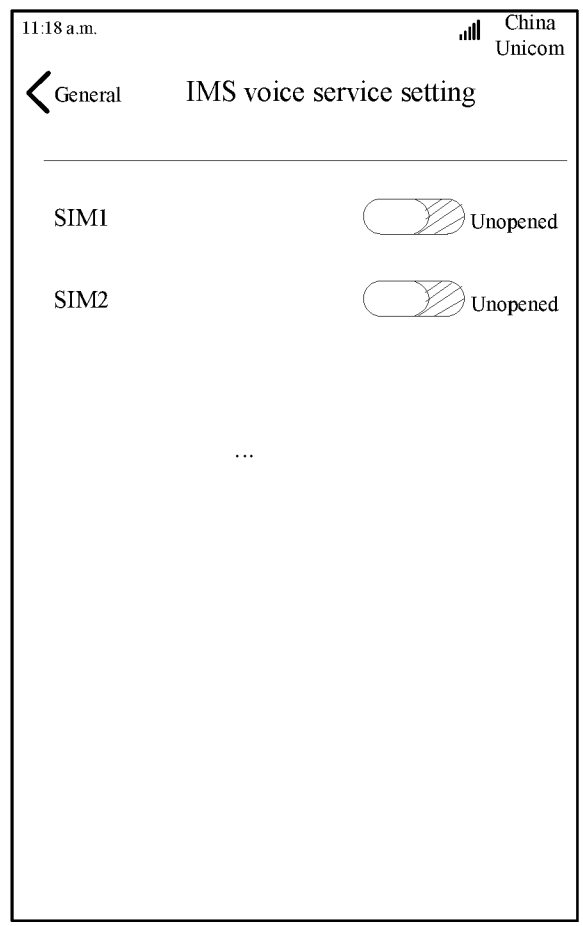
FIG. 6 is a schematic diagram illustrating a scenario of processing a paging message according to an example of the present disclosure.

For example, in an application scenario shown in FIG. 6, in the default state of the terminal device, the function of the IMS voice service corresponding to each SIM card is not enabled. The user may selectively enable the function of the IMS voice service corresponding to a particular SIM card according to his or her own requirements.

In some examples of the present disclosure, the NAS layer may directly determine whether the SIM card of the current paging cycle already enables the function of supporting the IMS voice service according to the related art.

If yes, block 101-52 is performed. At block 101-52, the NAS layer determines whether the SIM card of the current paging cycle already successfully registers the IMS voice service.

At this block, if the user already enables the function of supporting the IMS voice service, the terminal device will originate a process of registering the IMS voice service for the SIM card of the current paging cycle to the network side according to the related art. The NAS layer may determine whether the SIM card of the current paging cycle already successfully registers the IMS voice service.

At block 101-53, if it is determined that the SIM card of the current paging cycle already successfully registers the IMS voice service, it is determined that the SIM card of the current paging cycle supports the IMS voice service; otherwise, it is determined that the SIM card of the current paging cycle does not support the IMS voice service.

In some examples, the NAS layer may determine that the SIM card of the current paging cycle supports the IMS voice service only in the case that the SIM card of the current paging cycle already enables the function of supporting the IMS voice service and the SIM card of the current paging cycle already successfully registers the IMS voice service. It is considered that the SIM card of the current paging cycle does not support the IMS voice service in other cases.

In the above example, whether the SIM card of the current paging cycle supports the IMS voice service is determined when it is determined whether the target paging message belongs to the spam message paging the SIM card not providing the data service. While the accuracy of determining whether the target paging message belongs to the spam message paging the SIM card not providing the data service is guaranteed, the missed IMS phone call will be effectively avoided.

Corresponding to the above method examples, the present disclosure further provides apparatus examples.

Figure 7:
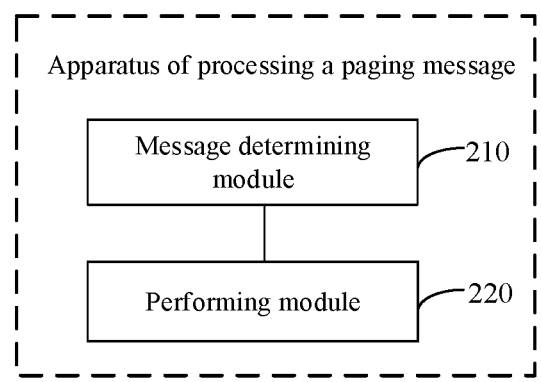
FIG. 7 is a block diagram illustrating an apparatus for processing a paging message according to an example of the present disclosure.

FIG. 7 is a block diagram illustrating an apparatus for processing a paging message according to an example of the present disclosure. The apparatus is applied to a terminal device supporting a plurality of Subscriber Identification Module (SIM) cards, and includes:

a message determining module 210, configured to determine whether a target paging message belongs to a spam message paging a slave SIM card after receiving the target paging message corresponding to a SIM card of a current paging cycle from a network side, wherein the slave SIM card is any one of the plurality of SIM cards which does not provide a data service; and a performing module 220, configured to discard the target paging message if the target paging message belongs to the spam message paging the slave SIM card.

Figure 8:
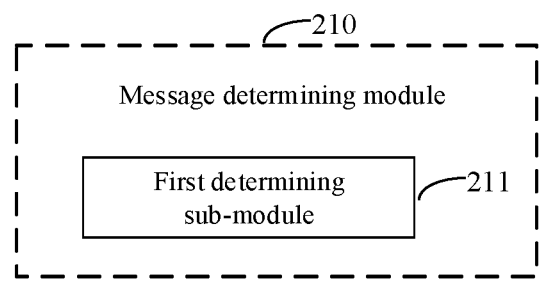
FIG. 8 is a block diagram illustrating an apparatus for processing a paging message according to another example of the present disclosure.

FIG. 8 is a block diagram illustrating an apparatus for processing a paging message according to another example of the present disclosure. The message determining module 210 includes:

a first determining sub-module 211, configured to determine that the target paging message corresponding to the SIM card of the current paging cycle from the network side is received when a Mobile Management Entity-Temporary Mobile Subscriber Identity (m-TMSI) included in a paging message is consistent with an m-TMSI stored in the SIM card of the current paging cycle after receiving the paging message from the network side.

Figure 9:
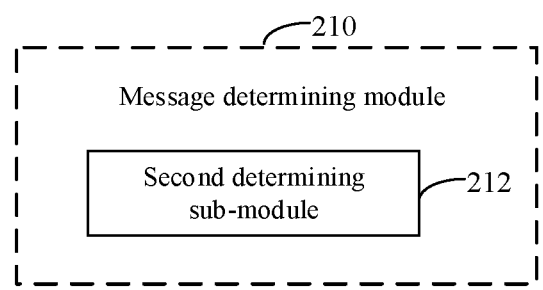
FIG. 9 is a block diagram illustrating an apparatus for processing a paging message according to a still example of the present disclosure.

FIG. 9 is a block diagram illustrating an apparatus for processing a paging message according to a still example of the present disclosure. The message determining module 210 further includes:

a second determining sub-module 212, configured to determine that the target paging message belongs to the spam message paging the slave SIM card if it is determined that a domain corresponding to the target paging message is a packet switching domain, the SIM card of the current paging cycle belongs to the slave SIM card, and the SIM card of the current paging cycle does not support an IP Multimedia Subsystem (IMS) voice service.

Figure 10:
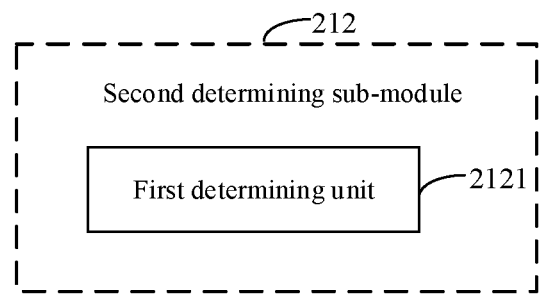
FIG. 10 is a block diagram illustrating an apparatus for processing a paging message according to a yet example of the present disclosure.

FIG. 10 is a block diagram illustrating an apparatus for processing a paging message according to a yet example of the present disclosure. The second determining sub-module 212 includes:

a first determining unit 2121, configured to determine whether the domain included in the target paging message is the packet switching domain by a Non-Access-Stratum (NAS) layer of the terminal device.

Figure 11:
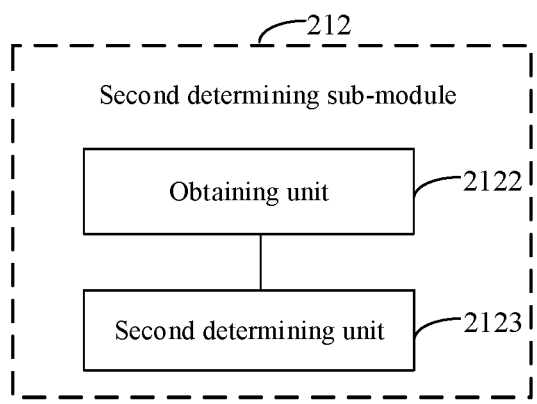
FIG. 11 is a block diagram illustrating an apparatus for processing a paging message according to a yet example of the present disclosure.

FIG. 11 is a block diagram illustrating an apparatus for processing a paging message according to a yet example of the present disclosure. The second determining sub-module 212 includes:

an obtaining unit 2122, configured to obtain a preset SIM card identifier of a master SIM card, wherein the master SIM card is any one of the plurality of SIM cards which provides the data service; and a second determining unit 2123, configured to determine that the SIM card of the current paging cycle belongs to the slave SIM card if the NAS layer determines that the SIM card identifier of the SIM card of the current paging cycle is inconsistent with the SIM card identifier of the master SIM card.

Figure 12:
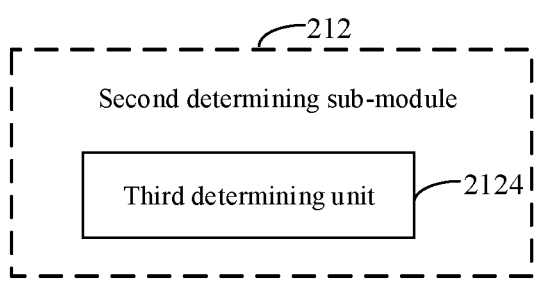
FIG. 12 is a block diagram illustrating an apparatus for processing a paging message according to a yet example of the present disclosure.

FIG. 12 is a block diagram illustrating an apparatus for processing a paging message according to a yet example of the present disclosure. The second determining sub-module 212 further includes:

a third determining unit 2124, configured to determine that the SIM card of the current paging cycle does not support the IMS voice service if the NAS layer determines that the SIM card of the current paging cycle does not enable a function of supporting the IMS voice service or the SIM card of the current paging cycle does not successfully register the IMS voice service.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, the present disclosure further provides a terminal device. The terminal device supports a plurality of Subscriber Identification Module (SIM) cards, and the terminal device further includes: a processor, and a memory storing processor executable instructions. The processor executable instructions are configured to: after receiving a target paging message corresponding to a SIM card of a current paging cycle from a network side, determine whether the target paging message belongs to a spam message paging a slave SIM card, wherein the slave SIM card is any one of the plurality of SIM cards which does not provide a data service; and discard the target paging message if the target paging message belongs to the spam message paging the slave SIM card.

Figure 13:
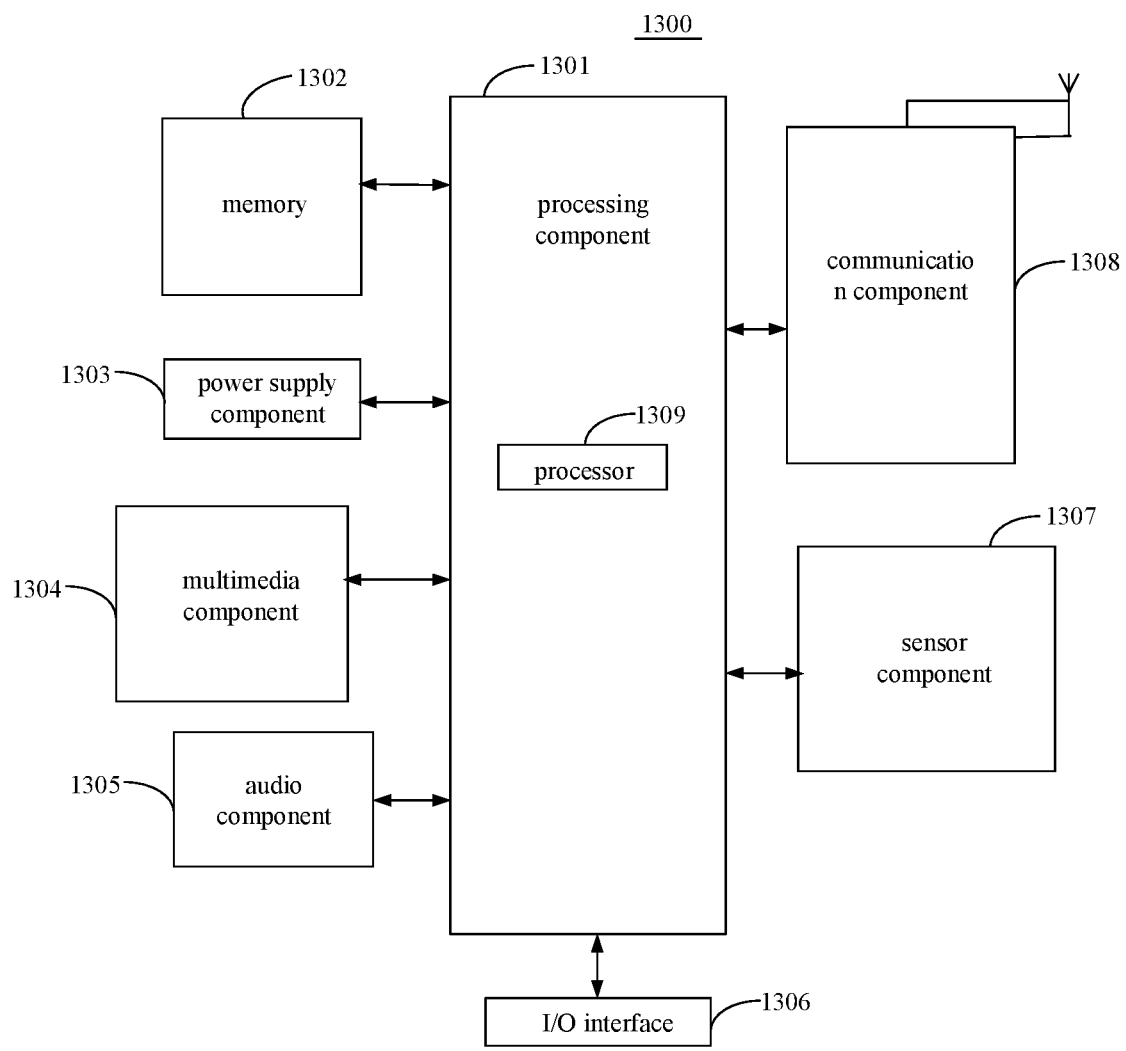
FIG. 13 is a schematic diagram illustrating a structure of a terminal device according to an example of the present disclosure.

FIG. 13 is a schematic diagram illustrating a structure of an apparatus for processing a paging message according to an example of the present disclosure. As shown in FIG. 13, an apparatus 1300 may be a terminal device such as a computer, a mobile phone, a digital broadcast terminal device, a message transceiving device, a game console, a tablet device, a medical device, a fitness device, and a personal digital assistant.

As shown in FIG. 13, the apparatus 1300 may include one or more of the following components: a processing component 1301, a memory 1302, a power supply component 1303, a multimedia component 1304, an audio component 1305, an input/output (I/O) interface 1306, a sensor component 1307, and a communication component 1308.

The processing component or processing circuit 1301 usually controls overall operations of the apparatus 1300, such as operations relating to display, a telephone call, data communication, a camera operation and a record operation. The processing component 1301 may include one or more processors 1309 for executing instructions to complete all or a part of blocks of the above method. Further, the processing component 1301 may include one or more modules to facilitate interaction between the processing component 1301 and another component. For example, the processing component 1301 may include a multimedia module to facilitate the interaction between the multimedia component 1304 and the processing component 1301.

The memory 1302 is configured to store different types of data to support operations at the apparatus 1300. Examples of such data include instructions, contact data, phonebook data, messages, pictures, videos, and so on for any application or method that operates on the apparatus 1300. The memory 1302 may be implemented by any type of volatile or non-volatile storage devices or a combination thereof, and the memory 1302 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1303 supplies power for different components of the apparatus 1300. The power supply component 1303 may include a power supply management system, one or more power supplies, and other components associated with generating, managing and distributing power for the apparatus 1300.

The multimedia component 1304 includes a screen for providing an output interface between the apparatus 1300 and a user. In some examples, the screen may include a Liquid Crystal Display (LCD) and a Touch Panel (TP).

In some embodiments, the screen can include an OLED (organic light emitting diode) display, or other types of displays.

If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1304 may include a front camera and/or a rear camera. When the apparatus 1300 is in an operation mode, such as a shooting mode or a video mode, the front camera and/or the rear camera may receive external multimedia data. Each of the front camera and the rear camera may be a fixed optical lens system or be capable of a focal length and an optical zoom capability.

The audio component 1305 is configured to output and/or input an audio signal.

For example, the audio component 1305 includes a microphone (MIC). When the apparatus 1300 is in an operation mode, such as a call mode, a record mode and a voice recognition mode, the microphone is configured to receive an external audio signal. The received audio signal may be further stored in the memory 1302 or sent via the communication component 1308. In some examples, the audio component 1305 further includes a speaker for outputting an audio signal.

The I/O interface 1306 provides an interface between the processing component 1301 and a peripheral interface module. The above peripheral interface module may be a keyboard, a click wheel, a button, or the like. These buttons may include but not limited to, a home button, a volume button, a start button and a lock button.

The sensor component 1307 includes one or more sensors for providing a state assessment in different aspects for the apparatus 1300. For example, the sensor component 1307 may detect an on/off state of the apparatus 1300 and a relative location of components. For example, the components are a display and a keypad of the apparatus 1300. The sensor component 1307 may also detect a position change of the apparatus 1300 or a component of the apparatus 1300, presence or absence of a touch of a user on the apparatus 1300, an orientation or acceleration/deceleration of the apparatus 1300, and a temperature change of apparatus 1300. The sensor component 1307 may include a proximity sensor for detecting the existence of a nearby object without any physical touch. The sensor component 1307 may further include an optical sensor, such as a CMOS or CCD image sensor used in an imaging application. In some examples, the sensor component 1307 may further include an acceleration sensor, a gyro sensor, a magnetic sensor, a pressure sensor, or a temperature sensor.

The communication component 1308 is configured to facilitate wired or wireless communication between the apparatus 1300 and other devices. The apparatus 1300 may access a wireless network based on a communication standard, such as Wi-Fi, 2G, 3G, 4G, or 5G, or a combination thereof. In an example, the communication component 1308 receives a broadcast signal or broadcast related information from an external broadcast management system via a broadcast channel. In an example, the communication component 1308 may further include a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technology.

In an example, the apparatus 1300 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the above method.

In an example, there is further provided a non-transitory computer readable storage medium including instructions, such as the memory 1302 including instructions. The above instructions may be executed by the processor 1309 of the apparatus 1300 to complete the above method. For example, the non-transitory computer readable storage medium may be a Read-Only Memory (ROM), a Random Access Memory (RAM), a CD-ROM, a magnetic tape, a floppy disk and an optical data storage device, etc.

When the instructions in the storage medium are executed by the processor, the apparatus 1300 is caused to execute the above method of processing a paging message.

The operations described in this disclosure can be implemented as operations performed by a data processing apparatus on data stored on one or more computer-readable storage devices or received from other sources. The apparatus can be implemented with hardware, software, or a combination thereof.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of processing a paging message, the method being applied to a terminal device supporting a plurality of Subscriber Identification Module (SIM) cards, and comprising:
   receiving a target paging message corresponding to a SIM card of a current paging cycle from a network side;
   determining whether the target paging message belongs to a spam message paging a slave SIM card, wherein the slave SIM card is any one of the plurality of SIM cards which does not provide a data service; and
   discarding the target paging message when the target paging message belongs to the spam message paging the slave SIM card.

2. The method of claim 1, wherein the receiving the target paging message corresponding to the SIM card of the current paging cycle from the network side comprises:
   receiving a paging message from the network side;
   when it is determined that a Mobile Management Entity-Temporary Mobile Subscriber Identity (m-TMSI) comprised in the paging message is consistent with an m-TMSI stored in the SIM card of the current paging cycle, determining that the target paging message corresponds to the SIM card of the current paging cycle from the network side is received.

3. The method of claim 1, wherein the determining whether the target paging message belongs to the spam message paging the slave SIM card comprises:
   determining that the target paging message belongs to the spam message paging the slave SIM card when it is determined that a domain corresponding to the target paging message is a packet switching domain, the SIM card of the current paging cycle belongs to the slave SIM card, and the SIM card of the current paging cycle does not support an IP Multimedia Subsystem (IMS) voice service.

4. The method of claim 3, further comprising:
determining whether the domain comprised in the target paging message is the packet switching domain through a Non-Access-Stratum layer of the terminal device.

5. The method of claim 3, wherein the determining that the SIM card of the current paging cycle belongs to the slave SIM card comprises:
obtaining a preset SIM card identifier of a master SIM card, wherein the master SIM card is any one of the plurality of SIM cards which provides the data service; and
determining that the SIM card of the current paging cycle belongs to the slave SIM card when it is determined that a SIM card identifier of the SIM card of the current paging cycle is inconsistent with the SIM card identifier of the master SIM card through a Non-Access-Stratum layer of the terminal device.

6. The method of claim 3, wherein the determining that the SIM card of the current paging cycle does not support the IMS voice service comprises:
determining that the SIM card of the current paging cycle does not support the IMS voice service when it is determined that the SIM card of the current paging cycle does not enable a function supporting the IMS voice service or the SIM card of the current paging cycle does not successfully register the IMS voice service through a Non-Access-Stratum layer of the terminal device.

7. A mobile phone implementing the method according to claim 1, wherein the mobile phone is the terminal device, and is configured to determine whether the target paging message belongs to the spam message paging the slave SIM card currently not providing the data service, to thereby discard the target paging message, thereby reducing antenna resources of the mobile phone being frequently switched between the SIM card and the slave SIM card when the spam message paging the SIM card not providing the data service.

8. The mobile phone of claim 7, further comprising a Non-Access-Stratum (NAS) layer configured to determine whether a domain corresponding to the target paging message is a packet switching domain, whether the SIM card of the current paging cycle belongs to the slave SIM card and whether the SIM card of the current paging cycle supports the IMS voice service, respectively; when it is determined that the target paging message belongs to the spam message paging the SIM card not providing the data service, it is determined whether the SIM card of the current paging cycle supports an IP Multimedia Subsystem (IMS) voice service, to thereby improve accuracy of determining whether the target paging message belongs to the spam message paging the SIM card not providing the data service while reducing missed IMS phone calls.

9. A terminal device supporting a plurality of Subscriber Identification Module (SIM) cards, and comprising:
a processor; and
a memory storing processor executable instructions;
wherein when invoking the processor executable instructions, the processor is configured to:
receive a target paging message corresponding to a SIM card of a current paging cycle from a network side;
determine whether a target paging message belongs to a spam message paging a slave SIM card, wherein the slave SIM card is any one of the plurality of SIM cards which does not provide a data service; and
discard the target paging message when the target paging message belongs to the spam message paging the slave SIM card.

10. The terminal device of claim 9, wherein the processor is further configured to:
receive a paging message from the network side;
when it is determined that a Mobile Management Entity-Temporary Mobile Subscriber Identity (m-TMSI) comprised in the paging message is consistent with an m-TMSI stored in the SIM card of the current paging cycle, determine that the target paging message corresponds to the SIM card of the current paging cycle from the network side is received.

11. The terminal device of claim 9, wherein the processor is further configured to:
determine that the target paging message belongs to the spam message paging the slave SIM card when it is determined that a domain corresponding to the target paging message is a packet switching domain, the SIM card of the current paging cycle belongs to the slave SIM card, and the SIM card of the current paging cycle does not support an IP Multimedia Subsystem (IMS) voice service.

12. The terminal device of claim 11, wherein the processor is further configured to:
determine whether the domain comprised in the target paging message is the packet switching domain through a Non-Access-Stratum layer of the terminal device.

13. The terminal device of claim 11, wherein the processor is further configured to:
obtain a preset SIM card identifier of a master SIM card, wherein the master SIM card is any one of the plurality of SIM cards which provides the data service; and
determine that the SIM card of the current paging cycle belongs to the slave SIM card when it is determined that a SIM card identifier of the SIM card of the current paging cycle is inconsistent with the SIM card identifier of the master SIM card through a Non-Access-Stratum layer of the terminal device.

14. The terminal device of claim 11, wherein the processor is further configured to:
determine that the SIM card of the current paging cycle does not support the IMS voice service when it is determined that the SIM card of the current paging cycle does not enable a function supporting the IMS voice service or the SIM card of the current paging cycle does not successfully register the IMS voice service through a Non-Access-Stratum layer of the terminal device.

15. A non-transitory computer-readable storage medium storing computer programs for execution by a processing circuit to implement the method according to claim 1.

16. The storage medium of claim 15, wherein the computer programs are executed by the processing circuit to further implement operations comprising:
receiving a paging message from the network side;
when it is determined that a Mobile Management Entity-Temporary Mobile Subscriber Identity (m-TMSI) comprised in the paging message is consistent with an m-TMSI stored in the SIM card of the current paging cycle, determining that the target paging message corresponds to the SIM card of the current paging cycle from the network side is received.

17. The storage medium of claim 15, wherein the computer programs are executed by the processing circuit to further implement operations comprising:
   determining that the target paging message belongs to the spam message paging the slave SIM card when it is determined that a domain corresponding to the target paging message is a packet switching domain, the SIM card of the current paging cycle belongs to the slave SIM card, and the SIM card of the current paging cycle does not support an IP Multimedia Subsystem (IMS) voice service.

18. The storage medium of claim 17, wherein the computer programs are executed by the processing circuit to further implement operations comprising:
   determining whether the domain comprised in the target paging message is the packet switching domain through a Non-Access-Stratum layer of the terminal device.

19. The storage medium of claim 17, wherein the computer programs are executed by the processing circuit to further implement operations comprising:
   obtaining a preset SIM card identifier of a master SIM card, wherein the master SIM card is any one of the plurality of SIM cards which provides the data service; and
   determining that the SIM card of the current paging cycle belongs to the slave SIM card when it is determined that a SIM card identifier of the SIM card of the current paging cycle is inconsistent with the SIM card identifier of the master SIM card through a Non-Access-Stratum layer of the terminal device.

20. The storage medium of claim 17, wherein the computer programs are executed by the processing circuit to further implement operations comprising:
   determining that the SIM card of the current paging cycle does not support the IMS voice service when it is determined that the SIM card of the current paging cycle does not enable a function supporting the IMS voice service or the SIM card of the current paging cycle does not successfully register the IMS voice service through a Non-Access-Stratum layer of the terminal device.

\* \* \* \* \*